United States Patent [19]

Medveczky et al.

[11] Patent Number: 5,182,770
[45] Date of Patent: Jan. 26, 1993

[54] SYSTEM AND APPARATUS FOR PROTECTING COMPUTER SOFTWARE

[76] Inventors: Geza Medveczky, 5395 Greenrich Rd., Castro Valley, Calif. 94552; Kelvin Lunsford, 36156 Bayonne Dr., Newark, Calif. 94560

[21] Appl. No.: 688,165

[22] Filed: Apr. 19, 1991

[51] Int. Cl.⁵ .................... H04L 9/00; H04K 1/00; H04K 9/00
[52] U.S. Cl. ........................................ 380/4; 380/25; 380/49; 340/825.34
[58] Field of Search ............... 380/3, 4, 49, 23, 25; 340/825.34

[56] References Cited

U.S. PATENT DOCUMENTS

| | | |
|---|---|---|
| 4,319,079 | 3/1982 | Best . |
| 4,829,296 | 5/1989 | Clark et al. .................. 340/825.31 |
| 4,866,769 | 9/1989 | Karp ....................................... 380/4 |

Primary Examiner—Stephen C. Buczinski
Attorney, Agent, or Firm—Hopgood, Calimafde, Kalil, Blaustein & Judlowe

[57] ABSTRACT

An integrated software piracy prevention system incorporates several characteristic identification codes identifying installation and software components. A separate security device is attached to and in communication with the protected computer system. It is interactively queried regarding proper authorization of the current user. This approach is unusually flexible and provides economical tracking of licensees and their use of sophisticated programs.

17 Claims, 7 Drawing Sheets

SYSTEM AND APPARATUS FOR PROTECTING COMPUTER SOFTWARE

The present invention generally relates to an integrated system to prevent the unauthorized access and/or copying of sophisticated software. More particularly, the present invention relates to a system and apparatus that are used in conjunction with a particular sophisticated software package to insure that only those users having the proper authorization password will have access to select application programs, and concurrently increasing the cost of unauthorized access to a point of economic misadventure.

BACKGROUND OF THE INVENTION

In the early years of the computer industry, software piracy was hardly an issue. The modest nature of software piracy during that time frame was attributable to the fact that computer systems were sold by major manufacturers with software and hardware "bundled" as one product, and further, the interaction between the hardware and software was controlled by proprietary machines specific assembly languages. The proprietary nature of competing systems prevented the bridging of software between non-compatible systems. In addition, the customers for these systems were major corporate clients having a concurrent need for significant follow-up service by the purveyor of the hardware/software system. This combination of factors created little market demand for pirated software; coupled with the potential liability under the applicable copyright laws, piracy would be highly visible and embarrassing.

As the computer industry matured, several fundamental changes in market structure developed, each diminishing the natural barriers to piracy. The first factor was the development of independent manufacturers of computer "peripheries" that entered the marketplace with "plug compatible" products for use with main-frame computers. These peripheral devices competed on price directly against the bundle systems, forcing the major manufacturers to de-couple the software from the hardware and license the software on its own. The importance and value of the software per se was instantly recognized.

Another factor was the development of open architecture operating systems. These open architecture operating systems, such as UNIX/XENIX, are increasingly found on many different manufacturers' computer hardware, and permit the use of the same commercial software on systems built by different manufacturers. This, in effect, exponentially increased the market for popular software and supported the growth of independent software companies unrestricted to a single manufacturer's hardware. With such large, distributed demand for illegally duplicated software, the economic incentive to pirate became substantial.

Software piracy may take one of two forms. The first involves the outright preparation of an illegal copy of a copyrighted software product. Software, for the most part, is packaged and sold on magnetic media; a format that is easily duplicated. The second form of piracy involves the expansion of software use beyond that expressly provided by license between the user and the software developer. For example, a software product may be licensed for a particular site, such as the licensee's headquarters building, and thereafter, the licensee provides satellite terminals at, e.g., sales offices for implementing the software product in violation of the terms of the license agreement.

To the extent that software piracy has increased as a problem in the U.S. computer industry, there have been two basic approaches for combating software piracy. The first approach involves a reliance on the copyright and trade secret laws in the United States and is implemented as an after market policing effort through both civil and criminal prosecution of the offenders. The second approach and the approach germane to the present patent application involves the creation of technical barriers to the copying and/or unauthorized use of certain software products.

The first technical barriers to software copying involved the distribution of programs embedded within the software that would defeat efforts to make a copy thereof ("copy protected"). In essence, the producer of a software product would install within the matrix of instructions separate programming statements that would prevent effective utilization of the program after copying. This approach had limited success for several reasons; it created inconveniences among authorized users and was somewhat easily defeated by maverick utility programs designed to overcome the anti-copying algorithms within the code.

For the most part, this technique has been discarded as an effective approach to prevent piracy. In general, it can be stated as a mathematical truism that efforts to prevent piracy in software terms alone are defeatable. With this prevailing understanding, a second approach is to take advantage of embedded identification coding associated with certain hardware products. For example, a computer may have a particular microprocessor that includes a serial number stored thereon. By periodically checking for the proper identification associated with that microprocessor, the system can insure that the software is being used on hardware in an authorized fashion. It has been found that hardware identification numbers provide an economic barrier that defeats software piracy to a great extent, in that the cost of defeating the piracy prevention mechanism is higher than the potential reward resulting therefrom.

Although effective for hardware with internal identification coding, no corresponding approach is available directly for hardware associated with open architecture operating systems, as these hardware products simply do not have a unique internal identification code. Efforts have been made to associate a unique identification code with particular hardware, and these include the use of ROM chips placed within the hardware. Of course, the problem with this approach is the chip and unique code are themselves portable and may be moved from machine to machine; thus, defeating the intended purpose of this approach. Moreover, the addition of external hardware with resident unique identification coding is associated with an incremental increase in cost, that must be borne by the purchase price or license expense of the software. If excessive in expense, such software piracy prevention devices will adversely impact the product's market.

An example of a product attachable to a computer system for storing unique system identification coding is distributed by [Rainbow, Inc.] and involves the placement of an ASIC (Application Specific Integrated Circuit) on the parallel port of a computer used for communication with a printer. The ASIC device employs a stream cipher as a means of encryption/decryption of a stored unique identification code. This mechanism makes it extremely difficult for the pirate to learn the identification code within the ASIC chip that unlocks the otherwise difficult to penetrate software. Although useful for less expensive software, the ASIC approach requires the serialization of the software, prior to delivery from the developer. This serialization is a painstaking operation that if circumvented would defeat this entire approach.

It was with this understanding of the previous effects to defeat piracy that formed the impetus of the present invention.

SUMMARY AND OBJECTS OF THE PRESENT INVENTION

It is, therefore, an object of the present invention to provide a system capable of preventing the unauthorized use of select computer programs.

It is another object of the present invention to provide a method for receiving an entered password and comparing the password with a stored value corresponding to a particular machine configuration and software serial number to insure proper user authorization.

It is a further object of the present invention to provide an apparatus for storing a select identification code wherein this apparatus further includes a microprocessor and I/0 channels for controlling the communication with an appended system.

It is yet a further object of the present invention to provide a method for receiving a user entered password having coded access level therein, and permitting access to select application program(s) and hardware corresponding to level of access delineated by the password.

It is yet another object of the present invention to encrypt and decrypt selected identification code information for transmission and authentication for access.

The above and other objects of the present invention are realized in an exemplary anti-piracy software protection system, integrating select program control commands with specific hardware. The system is based upon two separate identification codes, one associated with the application program or set of programs and the other identification code associated with a particular hardware configuration. In implementation, a password is devised for a particular system and level of access. This password is a 32 byte data field that incorporates both the identification code numbers for the application program and hardware. This password is only provided to those persons authorized to use a particular software/hardware system defined therein.

The software/hardware system provides an integrated mechanism for confirmation of a proffered password. The first portion of the authentication process involves the generation of the software (application program) identification code. This involves the extraction of embedded values directly from the object code of the application program package.

The second phase is directed to the extraction of an identification code associated with the hardware system. This identification code resides in a security device attached to a serial port on the computer system. In a manner more fully described below, during the password verification sequence, the system queries the peripheral device and receives in return specific and encoded identification information. This is used in combination with the embedded software values to discriminate the entered password.

In accordance with the varying aspects of the present invention, the peripheral device containing the hardware specific identification coding is "intelligent" and extremely difficult to characterize by destructive analysis. This device comprises a circuit board with specific I/O leads formatted for serial communication. On the circuit board resides an integrated microprocessor/memory semiconductor having control programming "fused" onto the associated circuitry. The circuit board also supports a dedicated encryption/decryption processor. The circuitry of the peripheral device is encased in a plastic box and partially filled with a fast curing epoxy material, thus rendering it extremely difficult to breakdown and reverse engineer.

In a multi-user system, a single security device will provide the validation coding to a multitude of separate application programs on the same system. To accomplish this, a single device validation subroutine is common to the overall valve pass security software and is accessible by the plurality of password validation routines which are embedded in the different application programs (having different passwords).

The foregoing features of the present invention may be more fully appreciated by reference to a specific embodiment thereof, as described hereinbelow in conjunction with the following figures of which:

BRIEF DESCRIPTION OF THE DRAWINGS

FIG. 5(A-C) depict a logic flow chart for the security device communication subsystem.

DETAILED DESCRIPTION OF THE PRESENT INVENTION

First, briefly in overview, the present invention is directed to an integrated system of hardware and software components having select identification code values incorporated therein. This system is used in conjunction with a commercial application program(s) package to selectively control the access to specific applications within the package pursuant to one or more password codes.

Each application package is made up of one or more applications separately accessible pursuant to authorization by the appropriate password. In this way, some or all of the application package may be licensed by the commercial user upon payment of the appropriate fee; once the amount of access is delineated, the appropriate password is provided permitting that level of access.

Two modes of protection are established within the computer system implementing the application's package for the licensed user. The first mode involves an embedded program identification code that identifies the program for access by a particular password. The second mode involves a separate installation identification code specific to the computer installation, in terms of cpu, disc drives, terminals, communication ports, printer ports and printers, etc., associated with a given system. This installation identification code is stored in a security device attached to a communication port on the associated CPU. This security device further includes an embedded intelligence (program controlled) delineating two-way communications with the application driven hardware.

The program identification code and installation identification code are combined to provide a system specific identification signature corresponding to a specific password. Upon receipt of the appropriate password, the system will permit access to application programming and hardware delineated by the identification information within the password coding.

Figure 1:
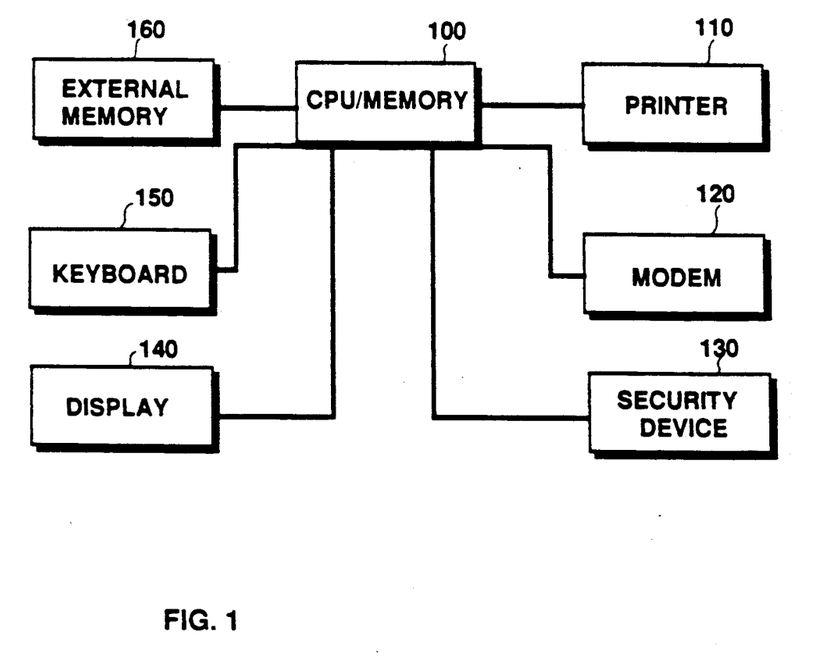
FIG. 1 provides a block diagram of a computer system incorporating the present invention.

Keeping the above overview in mind, reference is directed to FIG. 1 and the system depicted therein. In FIG. 1, a central processing unit (cpu), block 100, includes internal memory for storage and operation of application program packages. The cpu 100 is but a representation of many different machines ranging from sophisticated workstations to mini-computers supporting many terminals. Connected to cpu 100 and in communication therewith, via parallel port, is printer 110. Similarly, modem 120 and security device 130 are connected to the cpu 100, via two separate serial ports.

Continuing in FIG. 1, the user interface is represented by display 140 and keyboard 150; providing keyed entry of the user developed information and the review of specific output from the cpu. This user interface is, of course, the mechanism for entry of the password. Finally, external memory 160 is depicted for non-volatile storage of information. In this context, the above-described system is programmed with a set of application programs forming a package. These application programs are designed to implement certain desired functional operations, such as monitoring inventory, calculating payroll, depicting flow through complex structures, etc., as required by an authorized user. In addition to the object specific software, the applications include embedded programming designed to insure access is authorized and defeat efforts of unauthorized access in a manner more fully discussed below.

Figure 2:
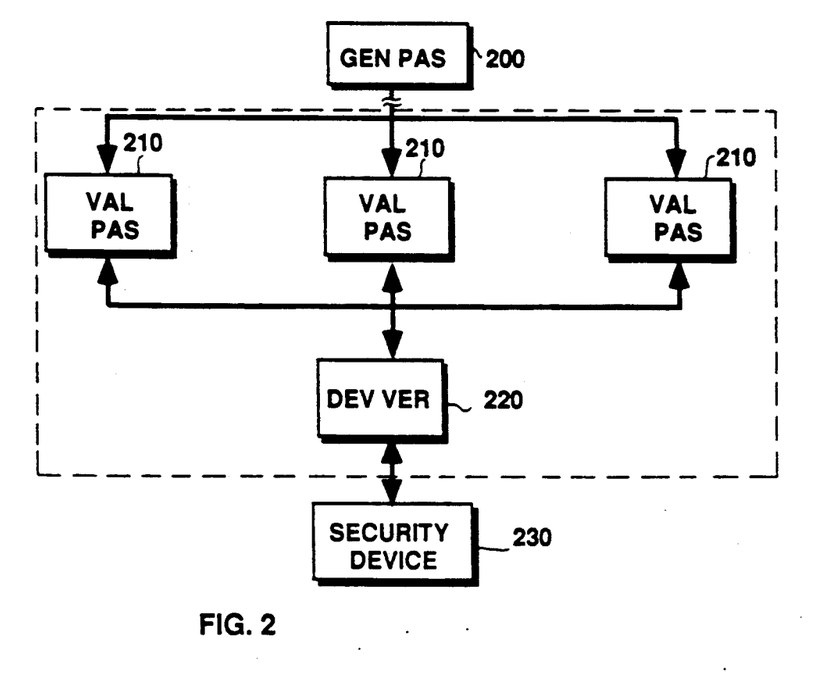
FIG. 2 provides a block diagram of the functional elements making up the subject invention.

Turning now to FIG. 2, the subsystems for implementing the present invention are depicted as functional blocks. GEN PASS, block 200, represents the subsystem for generating the appropriate password for authorizing access to a specific application program on a system. In practice, the system user contacts the purveyor of the application program package and requests access to a specific level in terms of hardware and software. The purveyor uses this information in a manner presented in FIG. 3 below to provide a password to the system user.

Continuing in FIG. 2, the software aspect of the system is generally depicted by the enclosed dotted lines and includes VAL PASS, block 210, and DEV VER, block 220. VAL PASS, block 210, is directed to the software implementation required to validate the entered password and selectively denies or accepts access to the system; the underlying logic of this system is presented in FIG. 4. As presented herein, there are three separate application programs, each having an individual password and a VAL PASS subroutine for implementation. DEV VER, block 220, is that aspect of software directed to the management of communications between the system and the security device 230. Operation of this is further depicted in FIG. 5 hereinbelow. The security device 230 is also described in more detail in FIG. 6.

Figure 3:
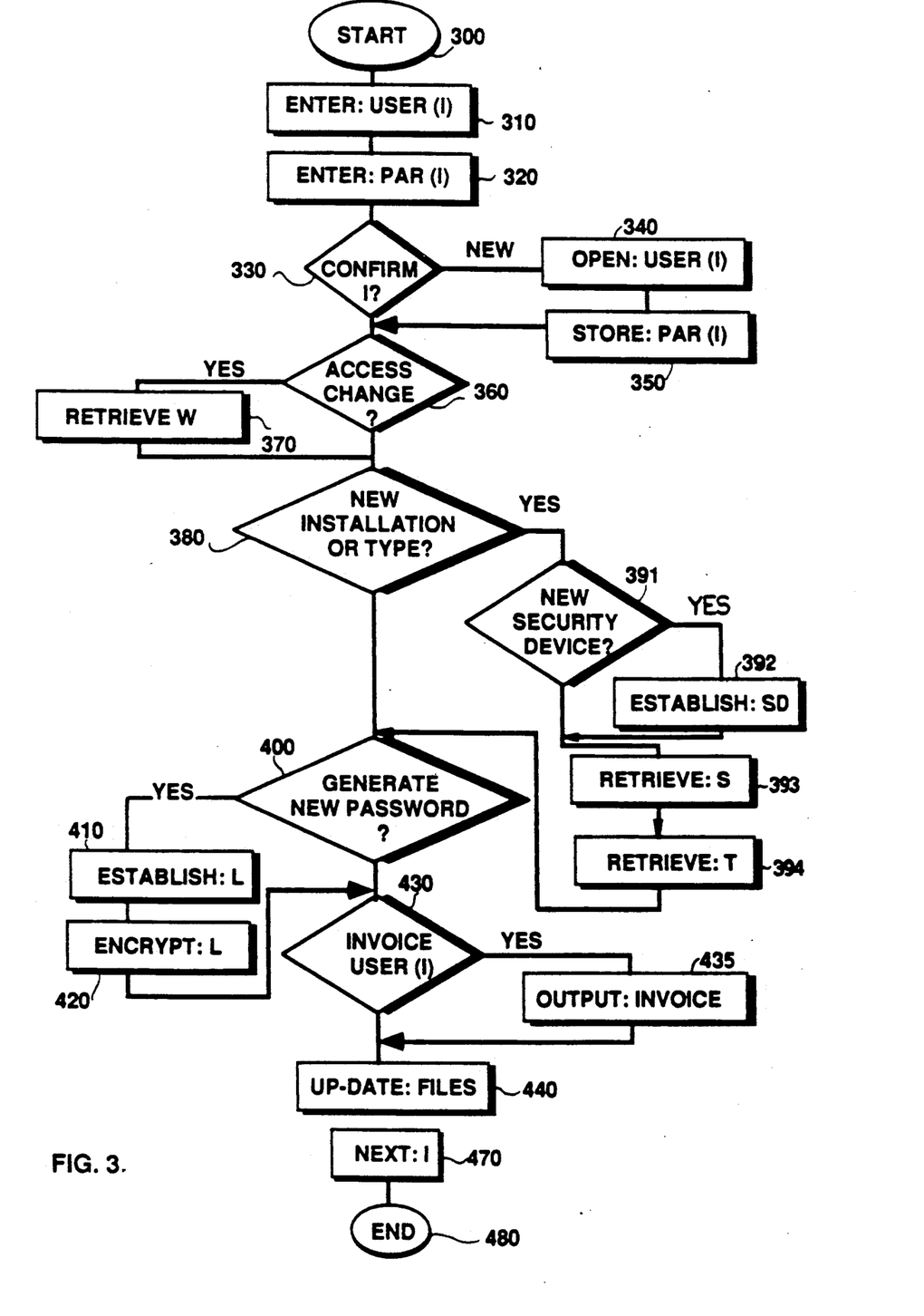
FIG. 3 depicts a logic flow chart for the password generation subsystem.

As can be seen from the above, the present system relies on both software and hardware elements in effecting the desired result. The preparation and tracking of the authorization passwords is handled by the supplier of the protected software. A computer system is programmed with a relational database of software Users that are authorized for access to specified levels of use of the software. In FIG. 3, the operation of the computer system directed to generating the appropriate password is presented in logic flow chart form.

Starting at block 300, at FIG. 3, logic conceptually begins with the entry of the user identification, block 310. This is followed by the entry of the parameters describing the level of access and the hardware configuration for the Ith user, block 320. This information is entered via conventional keyboard/display interface by a terminal operator.

The system first determines whether the user identification represents a system user previously authorized with that particular software, test 330. If the user is new, logic branches to block 340, wherein a new user file is generated, and block 350, for storage of the user's parameters in the new file. At test 360, the system determines whether the level of access is being changed by that user; if so, logic branches to block 370, wherein a new program identification code is calculated, W(I).

Continuing in FIG. 3, at test 380, the system queries whether an installation change is to be made; if "YES", logic branches to test 391. At test 391, the system determines whether the installation will also require a new security device; if so logic branches to block 392 setting forth instructions to issue or establish the new device. In either event, at blocks 393 and 394 the system calculates a new installation identification code, in terms of S(I) and T(I). Based on these new values, the system determines the need for a new password, test 400. A positive response branches logic to block 410, wherein the system calculates a system code for the newly entered parameters, L(I), based on the following relationship.

$$L = f(W, S, T) \qquad \text{EQUATION 1}$$

The system code is then encrypted into a 32 byte digital word, block 420; if an invoice is needed, test 430, it is prepared at block 435.

The generated password is then supplied to the system user by known transmission routes, including mail, telephone lines, etc. Thereafter the system updates the database files, block 440, and then increments to the next user, block 470.

Figure 4:
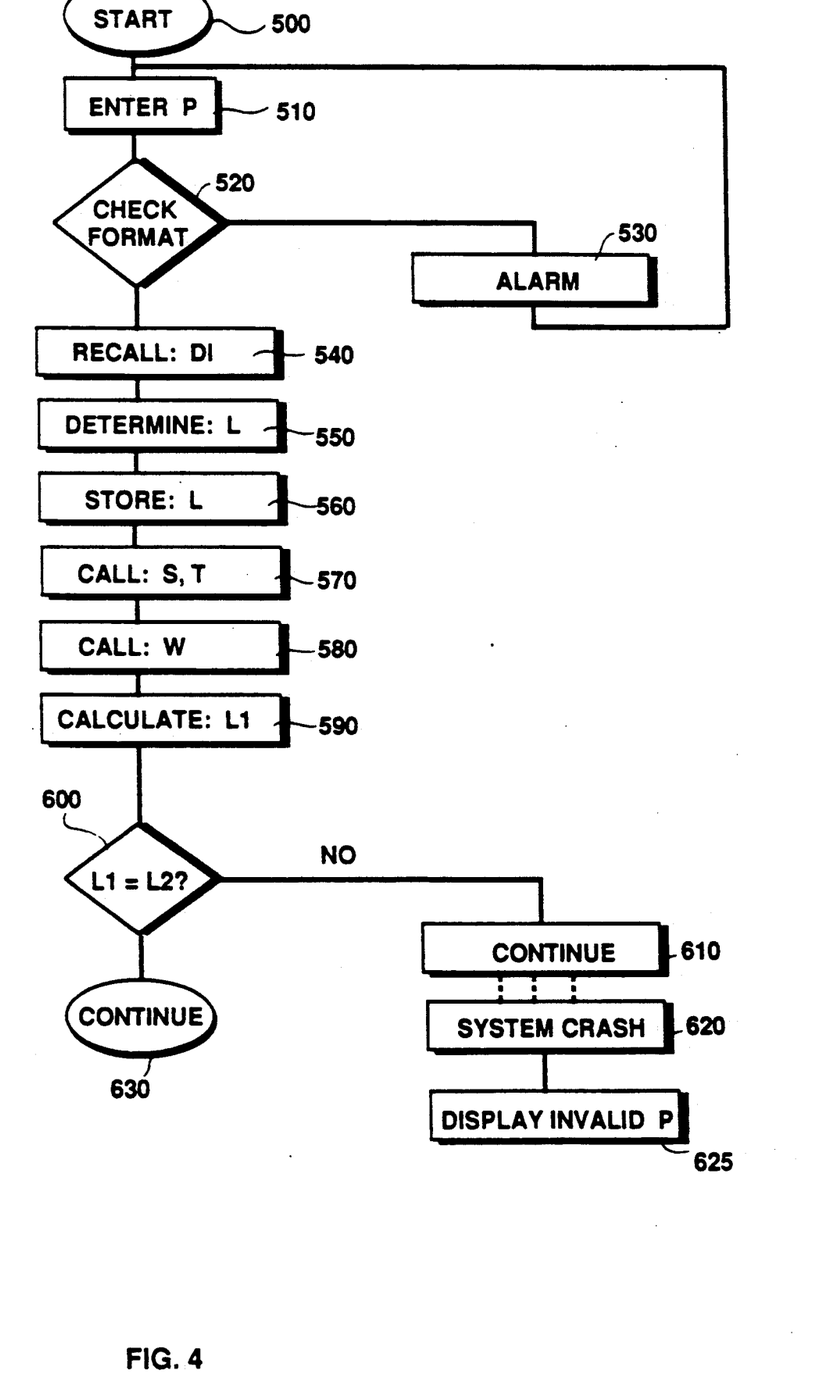
FIG. 4 depicts a logic flow chart for the password validation subsystem.

The use of licensed software in the above arrangement requires the presentation and affirmation of the appropriate password. This occurs at the specific user site and is implemented by the host hardware system installed to operate the licensed application programs. In FIG. 4, a logic flow chart is presented that depicts the overall process of validating the user entered password.

Beginning at block 500, operation conceptually begins with the entry of the password at block 510. A preliminary check is rendered, test 520, insuring the password format corresponds to the expected format. If the format is inappropriate, logic branches to block 530 and an alarm is triggered. A positive format permits logic to continue to block 540, wherein the decryption algorithm is recalled from its embedded position in the application program. This value is used to extract the system identification code, L(I), block 550, which is then temporarily stored, block 560. The system then attempts to calculate the installation identification code, in terms of S and T, at block 570. As discussed earlier, the installation identification code involves communications with a peripheral security device and these communications are governed by the logic expressed in FIG. 5 below.

Continuing in FIG. 4, at block 580, the program identification code is extracted from its position within the application code structure, and the system applies the above determined values to calculate the system code, block 590.

An important feature of the VAL PASS programming instructions is the manner the actual instructions are distributed throughout the application program. In this context, it should be recognized that the underlying application program performs the functions desired by the user, while the VAL PASS subroutine insures that the user is authorized for this system.

The integration between the VAL PASS subroutine and the remainder of the application program is quite complex. Conventionally, program modules are coded in well structured, fully defined blocks of command statements. In sharp contrast, the VAL PASS instructions are dispersed among the application codes in an apparent random fashion, wherein various conditionals and branches are obscured as to purpose and coded in a convoluted manner. This approach is similar to the deliberate plant of a "bug" into the program, wherein an invalid password activates the bug causing the system to crash. In this manner, the system operates in a seemingly smooth process after the receipt of an invalid password, allowing a billion machine instructions to pass between the "implant" and the "crash".

Providing such a distributed network of complex coding creates a nearly impossible legacy to retrace by a potential pirate even if provided the source code to do so. After the system crash, the VAL PASS program displays "invalid password" to the user.

Referring again to FIG. 4, the derived value for the system code is compared to the entered value extracted from the password, at test 600. If the system code comparison fails, a negative response results from test 600, system access seemingly continues unabated until, a short time and, thereafter, a system crash is effected. Assuming a proper authorization password, an affirmative response to test 600 results in access to the system, block 630.

At various junctions in the logic flow path, the system performs an encryption and/or decryption transformation of specific information regarding the password and/or associated system identification codes. For the sake of clarity, the following two equations represent the encryption and decryption transformation, respectively:

$$A = E_x(B) \quad \text{EQUATION 2}$$

$$B = D_x(A) \quad \text{EQUATION 3}$$

There are a variety of encryption technologies available that will be suitable for use with the present invention. A fairly sophisticated encryption system has been developed by MIT Laboratories and is described in U.S. Pat. No. 4,405,829, entitled "Cryptographic Communications System and Method", the teachings of which are incorporated herein by reference as if restated in full. The advantages of the approach disclosed in the above-identified patent is in the use of a public key cryptography, and the difficulty in factoring very large numbers.

Other cryptography algorithms may be used without departing from the concepts disclosed herein. Moreover, implementation of one or many of these cryptography systems can be readily accomplished with dedicated math processor chips readily available in the marketplace, such as those distributed by Cylink and others.

The description herein of the underlying software logic employs the use of several variables. These variables are presented in the Table below.

| TABLE OF VARIABLES | | |
|---|---|---|
| A | = | acknowledge session key (good/bad) |
| B | = | filler bytes |
| C | = | checksum byte |
| D | = | decryption algorithm |
| E | = | encryption algorithm |
| F | = | session flag byte (new/same session) |
| G | = | session key status (match/no match) |
| I | = | identify user - counter |
| J | = | session counter |
| K | = | session key |
| L | = | system code |
| P | = | password |
| Par | = | user parameters for hardware/software |
| Q | = | session request |
| RND( ) | = | random number |
| S | = | installation identification code . |
| T | = | installation type |
| USER | = | customer/licensee |
| V | = | session response |
| W | = | program identification code |
| X | = | session request (encrypted) |
| Y | = | session response (encrypted/constant) |
| Z | = | session response (transmitted) |

Figure 5A:
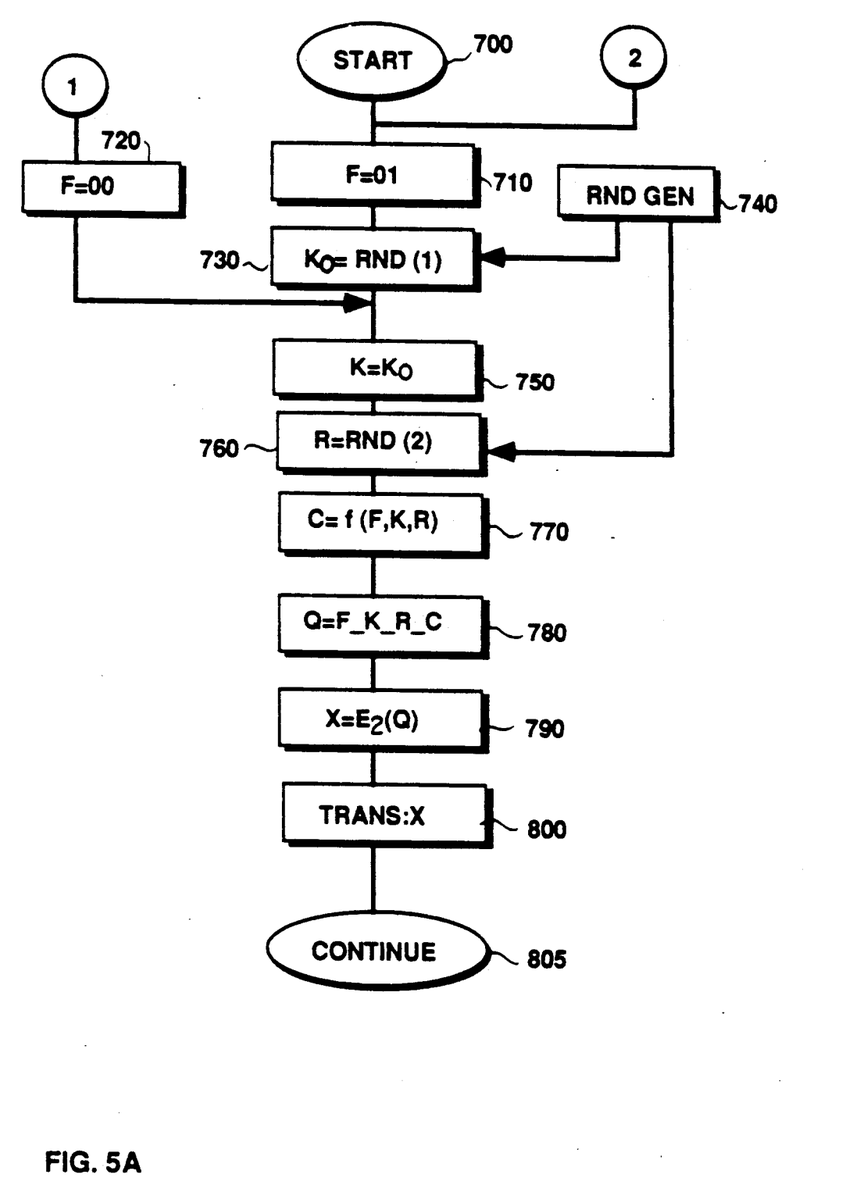

Turning now to FIG. 5A, logic associated with the device verification subroutine (DEV VER) is presented. The logic disclosed in FIG. 5A is directed to the operative communication by the host computer to an appended security device conforming to that installation. This communication is initiated by the host to retrieve from the security device values for the installation identification code, S, and installation type, T.

Beginning with start, block 700, reflecting the first pass through the host transmitter logic, logic continues to block 710, wherein the value for, F, is set indicating a new session. As can be seen, the use of the host transmitter code is ongoing as indicated by loop continuation points "1" and "2" reflecting points of entry from FIG. 5C. In this regard, when logic continues through "1", the session flag byte, F, is set at "00" indicating a current session, block 720.

Assuming a new session, logic continues to block 730, wherein an initial session key is accepted from random number generator, 740. Using this nomenclature, $K_o$ indicates the current value for the session key, K, and is so set at block 750. A second random number is accepted from the random number generator and assigned value, R, at block 760. The session checksum byte, C, is then calculated from the values of F, K and R previously established. The use of checksum bytes are, per se, well known as a means to insure accurate transmission of data on a communication line. Using these values for F, K, R and C in concatenated form, the value for Q is established at block 780. At block 790, Q is encrypted into X and thereafter X is transmitted for the common RS-232 port to the security device, block 800.

The value prepared for Q is formed of the flag byte, F, the session key, K, a random number, R, and checksum byte, C. For proper transmittal of this value in the encrypted form, various protocol algorithms may be employed to conform with the standards of the communication port and receiver. This will require the inclusion of a preamble "sync" string and a string terminator, so that the receiver may properly coordinate the incoming data stream for translation.

The encryption algorithm presented above is provided in generic form for the particular use of a public key encryption system, such as the previously mentioned RSA system. It is beneficial to contour the encryption/decryption keys so that the time necessary for the encryption and decryption calculations is asymmetrical. Therefore, the use of a $E_2$ (Q) function, with a smaller value of $E_2$, vis-a-vis $D_2$, will provide substantial security while simultaneously placing most of the calculation burden onto the decryption process. In the present context, this is a significant advantage because the $E_2$ algorithm is handled by the host general purpose microprocessor, diverting its attention from other matters, while the $D_2$ algorithm is handled by the security device dedicated processor, that is otherwise not required for other tasks. The use of this asymmetrical encryption/decryption mechanism is applied to the other points of processing in the overall system to conserve processor access.

Within the security device resides a program intelligence to evaluate the host transmissions and respond accordingly. The basic logic of this operation is described in FIG. 5B, with logic conceptually beginning at 810. Ancillary to the receipt of a host transmission, the security device, upon power up, begins a modulo counter, block 820. This module counter provides the ability to generate truly random values which are assigned to J, block 830, when called upon by the system. At block 840, a host transmission is received and decrypted, and, at block 850, a checksum value C1 is calculated from F, K and R.

Figure 5B:
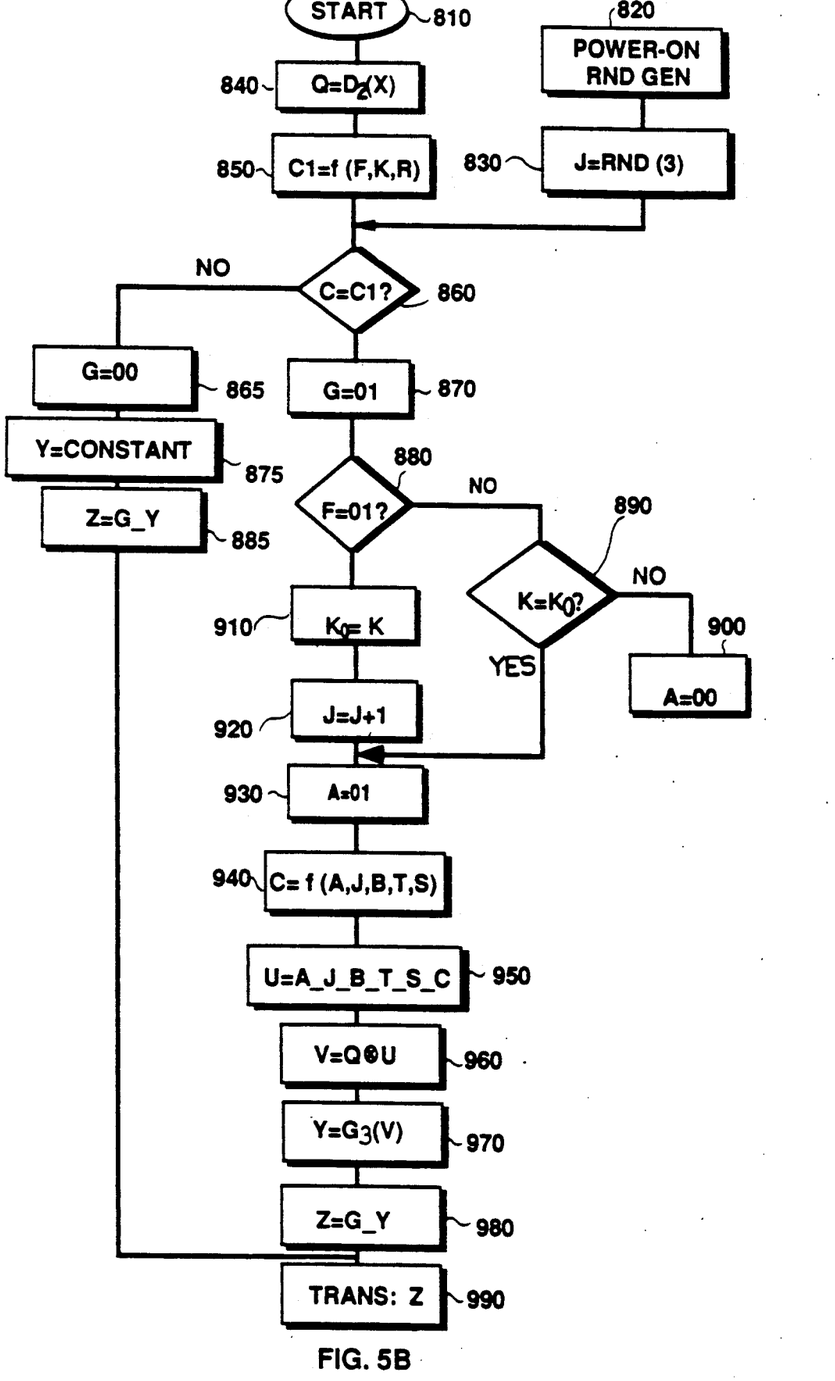

The calculated checksum value C1 is then compared to the transmitted checksum C, at test 860. Assuming a positive response, logic continues to block 870, wherein the checksum status byte is given a value representative of a valid checksum (G=01); the values used in the flowcharts are for purposes of explanation only, actual values will be larger using hexadecimal representations.

Continuing is FIG. 5B, at test 880, the flag byte is checked to determine whether a new session has been initiated or the communication is merely a continuation of the previous session. For this example, the value F=01 indicates a new session. A negative response to text 880 then branches to test 890; at test 890, the current session key is compared to the previous session key. A negative response to test 890 indicates that the incoming session key is inappropriate and possibly from a system that is improperly sharing the RS-232 port. If so, logic branches to block 900, wherein the system sets the key acknowledge byte, A, as bad, (00). A positive response to test 890 otherwise will set the acknowledge byte as good, block 930.

Returning to test 880, a positive response indicating a new session will direct the system to store the current session key, K, as $K_o$, block 910, and then increment the session counter, J, block 920. At block 940, a new checksum byte is calculated as a function for the above established values, and for the recalled values of the installation type, T, and the installation identification code, S. Thereafter, the system prepares its response to the host transmission in the form of U, as reflected in block 950.

Taking the above value for U, the system then performs an operation, per se, well known in digital processing and referred to as XOR, block 960, providing a value for V. This operation is a bit-by-bit mapping of two values forming one of the same length. The function is reversible. In this regard, the function is such that when V is XOR'ed with Q it will result in U, the initial value. At block 970, the value for V is encrypted to form Y. This value for Y is then combined at block 980, with the checksum status byte into Z, which is then transmitted according to the protocol of the system, block 990, back to the host.

Returning back to block 860, a negative response regarding the transmitted checksum indicates a transmission error and logic immediately branches to block 865, wherein G is set as bad. The system then generates a constant for Y having a repeating symmetry, block 875, and combines G and Y to form Z, block 885. This value is then sent back to the host, via transmitter, block 990.

Figure 5C:
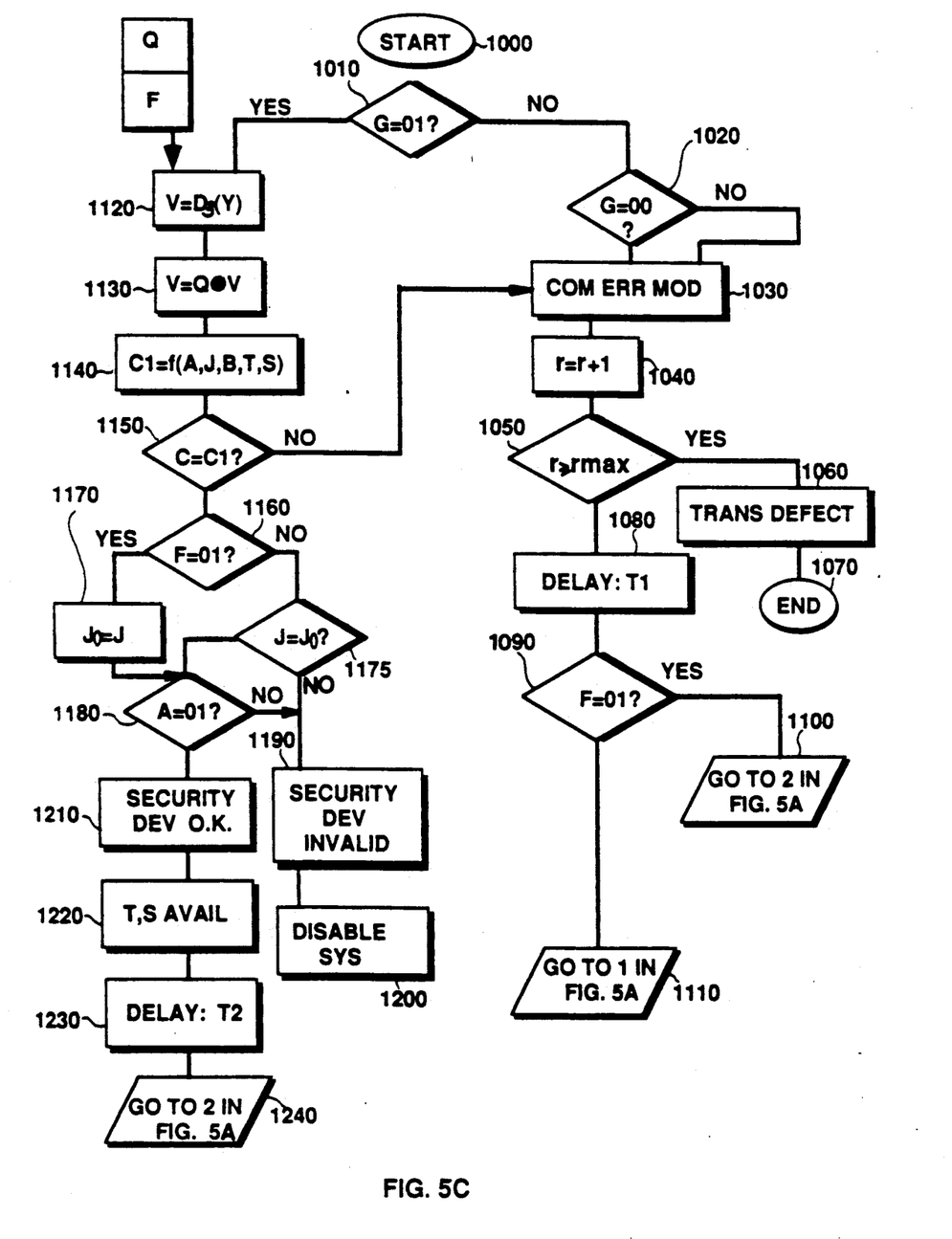

Resident in the host computer is a further programming module for receiving and decoding responses from the security device. The logic associated with this module is depicted in FIG. 5C. Logic begins conceptually at start, block 1000, and proceeds to test 1010, wherein the checksum status byte is evaluated. A negative response to test 1010 indicates a transmission failure and branches to test 1020, wherein the system determines whether the checksum value is bad or gibberish. In either event, logic proceeds to a separate communication error module for further processing, block 1030. A counter for transmission errors is incremented, block 1040; if this counter exceeds a preset maximum, test 1050, logic branches to block 1060 triggering a defect and terminating system operation, block 1070. Assuming a negative response to test 1050; retry for the transmission will occur after delay, block 1080. The path for the retry will depend on the session byte, F, test 1090, reflecting a new session, 1100, or a continuation of the same session, block 1110.

Returning back to test 1010, a positive response indicates successful transmission and logic branches to block 1120, wherein Y is decrypted forming V. V is then XOR'ed with Q (recalled from memory) forming U, block 1130. Thereafter, the transmitted value for U is used to calculate C1, the checksum byte, block 1140. At test 1150, this checksum byte is compared to the transmitted value to discern a transmission error in the response from the security device. If an error is so detected, logic branches to the communication error module 1030; otherwise, logic continues to test 1160. At this test, the flag byte is evaluated to discern either a new or continuing session. A positive response to test 1160 causes logic to branch to block 1170, wherein $J_o$ is set equal to the current value of J (session counter). Continuing on this path, logic leads to test 1180, wherein the acknowledge byte is tested. A negative response to test 1180 indicates that the security device is responding to an improper host transmission and, thus, logic branches to block 1190 indicating the invalidity of the security device and to block 1200 which initiates the disabled system sequence.

Returning to test 1160, a negative response reflects the continuation of a previously initiated session, and test 1175 confirms whether the session counter is unchanged. A negative response to test 1175 indicates that an additional host communication has transpired with the security device and, therefore, logic branches to block 1190. On the other hand, a positive response to test 1175 reflects no interleaving use of the security device and continues through test 1180 to block 1210 reflecting proper utilization of the security device. Thereafter, the subroutine extracts the values for T and S and makes these available for system confirmation of the entered password, as presented in FIG. 4 above. A delay on the order of 10 to 15 minutes is placed in the system and then the communication process is restarted, block 1240.

Figure 6:
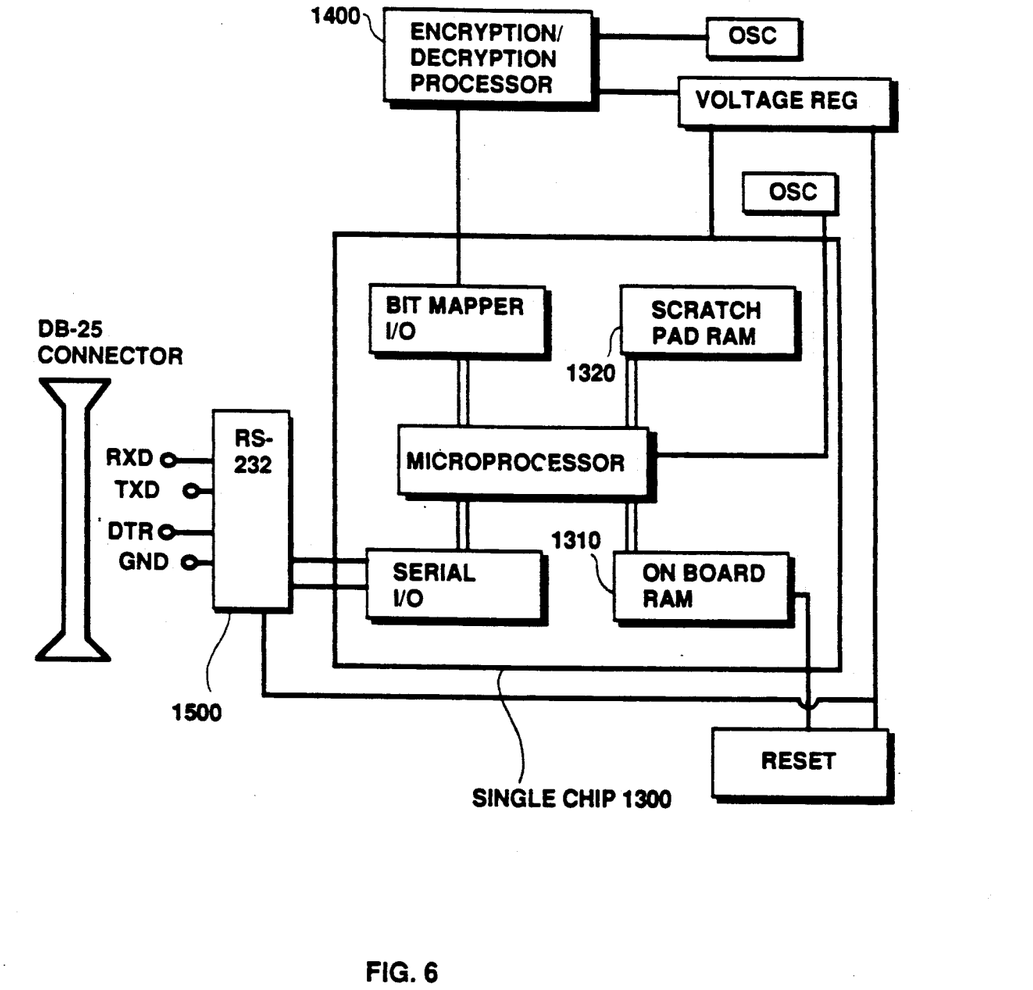
FIG. 6 provides a schematic diagram of the security device of the present invention.

Turning now to FIG. 6, a schematic diagram of the security device is provided as stated earlier. This security device has on-board intelligence to govern access to the encoded identification numbers therein. More specifically, the microprocessor, 1300, includes on-board RAM, 1310, and scratch pad RAM, 1320. The data stored on on-board RAM is fused into place to prevent future unauthorized readout thereof.

The present system foresees the use of complex exponential encryption algorithms, which are time consuming calculations for conventional microprocessors. The security device, therefore, includes a dedicated exponentiator circuit, 1400, for implementation of the encryption/decryption algorithms. Communications with the security device pass through, per se, well known RS-232 port, 1500.

The password generation computer and host computer described above are governed by logic that has been described in generic flow chart form. The hardware operating system and programming language applied to each of these computer systems is not particularly limitative and the reliance on BASIC command instructions where used is merely for illustrative purposes.

The above-described arrangements are merely illustrative of the principles of the present invention. Numerous modifications and adaptations thereof will be readily apparent to those skilled in the art without departing from the spirit and scope of the present invention.

What is claimed is:

1. In a data processor, an integrated system for the prevention of unauthorized access to select programming, said integrated system comprising:
   a) means for non-volatile storage of application control parameters including a decryption value and a program identification code;
   b) means for receiving an unconfirmed system identification code in an encrypted form, wherein said unconfirmed system identification code corresponds to an unconfirmed program identification code and an unconfirmed installation identification code;
   c) means for decrypting and storing said encrypted unconfirmed system identification code;
   d) means for storing an installation identification code including logic control means and code transformation means connected to a peripheral port of said data processor;
   e) means for accessing said stored installation identification code in encrypted form and decrypting said stored installation identification code; and
   f) means for confirming whether the unconfirmed system identification code conforms with the stored installation identification code and the stored program identification code.

2. The system of claim 1, wherein the means for confirming includes means for initiating a complex disabling sequence that results in a data processor failure after a significant time interval.

3. The system of claim 1, wherein the encryption algorithm is a public key system, based on large prime numbers.

4. The system of claim 1, wherein said means for storing an installation identification code further includes a session key means for presenting unauthorized use of said storing means.

5. The data processor of claim 1, wherein said select programming includes two or more separate programs separately accessible by distinct program identification codes.

6. The system of claim 1, wherein said encryption algorithms employ asymmetrical values for encryption/decryption operations.

7. A method for preventing unauthorized access to select computer programs for use on a computer installation, comprising the steps of:
   a) incorporating into said computer program a validation password module;
   b) incorporating into said computer installation a security device;
   c) incorporating into said computer installation a device verification module;
   d) receiving an entered password;
   e) extracting a program identification code from said validation password module;
   f) extracting an installation identification code from said security device; and
   f) confirming said entered password by comparing said password to a value representing said program identification code and said installation identification code.

8. The method of claim 7, wherein said installation identification code includes installation type information.

9. The method of claim 7, wherein all communications with said installation and between said installation and said security device are encrypted.

10. The method of claim 9, wherein the encryption/decryption algorithms are asymmetrical, placing the majority of calculation burden on the less used, dedicated processor of the security device.

11. In combination in a data processing system for the prevention of unauthorized access to select application programs, said system comprises: means for receiving and decrypting an unconfirmed password in digital form; means for recalling from said data processing system a program identification code associated with an application program stored in said data processing system; security device means for storing an installation identification code identifying an installation for operating said application program; means for communicating with said security device means and retrieving said installation identification code; means for comparing said unconfirmed password with a value characterized by said program identification code and installation identification code and confirming said password if a match occurs.

12. The system of claim 11, wherein said communication means includes encrypting a request having a unique session key and a random number value for transmitting to said security device.

13. The system of claim 12, wherein said security device includes a decryption processor for decrypting incoming requests.

14. The system of claim 13, wherein said security device includes processor means to store said session key and set a session counter.

15. The system of claim 14, wherein said security device responds to said request by recalling said installation identification code from memory and transmits a response formed of said acknowledged installation identification code, a session key byte, and session counter.

16. The system of claim 15, wherein said response is encrypted prior to transmission.

17. The system of claim 16, wherein said comparison means will create an essentially untraceable system crash if the password cannot be confirmed or the security device is improperly accessed.

* * * * *